United States Patent [19]
Krause

[11] Patent Number: 5,669,329
[45] Date of Patent: Sep. 23, 1997

[54] WATER BOTTLE APPARATUS

[75] Inventor: Robert C. Krause, Arlington Heights, Ill.

[73] Assignee: Pets International, Ltd., Arlington Heights, Ill.

[21] Appl. No.: 697,039

[22] Filed: Aug. 19, 1996

[51] Int. Cl.⁶ ........................................ A01K 7/00
[52] U.S. Cl. ............................. 119/72.5; 119/477
[58] Field of Search ................. 119/72.5, 72, 464, 119/465, 454, 475, 477; 215/390, 395; 222/180

[56] References Cited

U.S. PATENT DOCUMENTS

| | | |
|---|---|---|
| 2,773,473 | 12/1956 | Martin ........................... 119/464 |
| 4,188,914 | 2/1980 | Lage ........................... 119/72.5 X |
| 5,304,634 | 4/1994 | Ho ................................. 119/477 |
| 5,549,074 | 8/1996 | Hui ................................ 119/477 |

*Primary Examiner*—Robert P. Swiatek
*Assistant Examiner*—Yvonne R. Abbott
*Attorney, Agent, or Firm*—Douglas B. White

[57] ABSTRACT

This bottle apparatus includes a flat-sided bottle member for a flush fit against a cage. A flexible, resilient clip member attaches to the cage and engages vertical mounting edges on the water bottle. Outwardly flaring arms serve to guide the bottle into the clip and to spread the clip when the bottle is inserted.

15 Claims, 1 Drawing Sheet

WATER BOTTLE APPARATUS

BACKGROUND OF THE INVENTION

1. Field of the Invention

This invention relates generally to water bottles used with cages of small animals, and more particularly to an improvement which facilitates the removal and refilling of the bottle as well as providing a more secure attachment.

2. Description of the Prior Art

Prior art water bottle designs are typically attached by a wire or sheet metal harness. These designs are easily dislodged, if bumped, and as a result are usually mounted inside a cage where they are less vulnerable. However, with the harness mounting and the inside location, removal and refilling is quite cumbersome.

SUMMARY OF THE INVENTION

It is accordingly an objective of the present invention to provide a water bottle apparatus which securely fastens against flat cage surfaces, is safely mounted outside a cage and is easily accessible and refillable.

The bottle apparatus herein includes a flat-sided bottle having a ridge or edge defined on opposing vertical sides thereof. A flexible, resilient clip member attaches to the wire or glass cage and provides engaging hooks to catch the edge on the water bottle. Outwardly flaring clip arms serve to guide the bottle into the clip and to spread the clip arms when the bottle is pushed against the clip.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
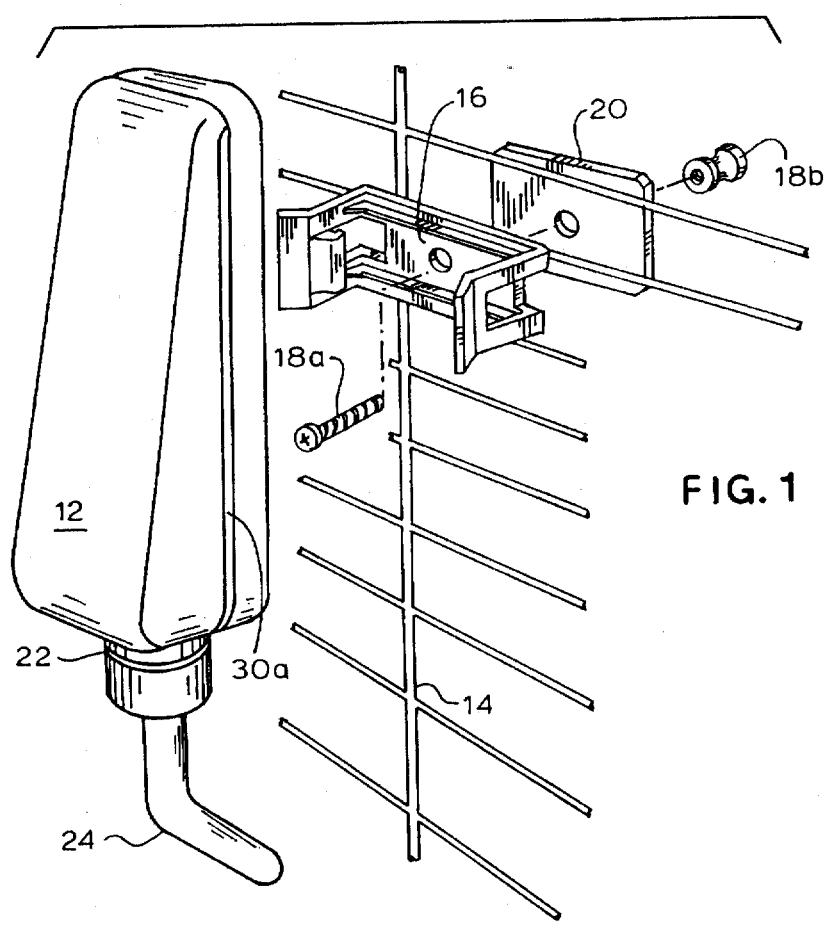
FIG. 1 is a perspective exploded view of the water bottle apparatus of the present invention.

Turning first to FIG. 1 there is shown a water bottle apparatus in accordance with the present invention poised for attachment to a cage or other enclosure for a small animal. Particularly, there is shown a bottle 12 shaped with a flattened back and positioned to be mounted flush against an animal enclosure 14 by means of a mounting clip 16, with the flat back of the bottle fitting flush against the flat base of the clip. This clip may be attached to a cage by means of a bolt 18a, nut 18b and retaining plate 20. (In the alternative, the clip may be attached to a smooth surface by suction cups or other means known to the art.) Consistent with the prior art, this bottle presents the usual neck opening 22 for refilling the bottle and the usual outlet 24 for the animals to drink from.

Attachment of the water bottle is accomplished by use of vertically oriented edges 30a and 30b defined along opposing vertical sides 32a and 32b of the water bottle. In the preferred embodiment these engaging edges are formed by the sharp right angle transition of a wider bottle section to a narrower section, but may be accomplished by use of any equivalent ridge or edge. These engaging edges are grasped by catch means and are shown in the preferred embodiment in the form of hook members 32a and 32b positioned to latch the engaging edges of the water bottle when it is inserted into the clip.

Figure 2:
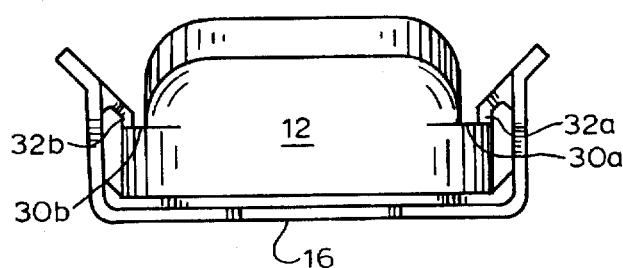
FIG. 2 is a top view of the water bottle and clip of FIG. 1, with the bottle installed within the clip.
Figure 3:
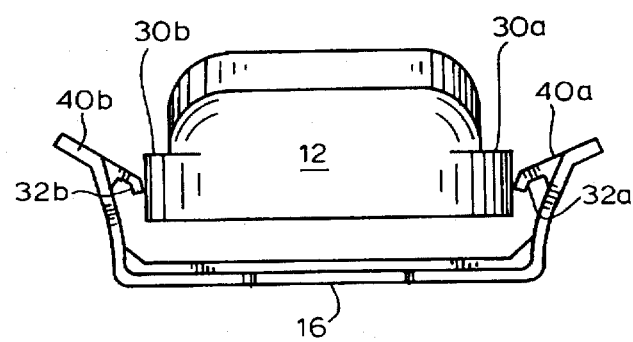
FIG. 3 is a top view of the water bottle and clip of FIG. 1 with the clip flexing to accept/release the water bottle.

Insertion and removal of the water bottle is facilitated by the resilient nature of the clip which allows the hook members to be spread as shown in FIG. 3. In this spread position the bottle may be inserted or removed. When the bottle is being inserted, once the wider section of the bottle is pushed past the hook members, they will snap back into their original, unflexed position (FIG. 2) to latch the bottle in place. Outwardly flaring arms 40a and 40b extending forwardly from the hook members serve to guide the bottle into the clip during insertion.

From the foregoing description, it will be apparent that modifications can be made to the apparatus and method for using same without departing from the teachings of the present invention. Accordingly, the scope of the invention is only to be limited as necessitated by the accompanying claims.

I claim:

1. A water bottle apparatus for use with an animal enclosure comprising:
   a bottle member having vertically oriented mounting edges defined along opposing vertical sides thereof; and
   clip means comprising a base for attachment to the animal enclosure, and arms extending from said base, wherein said arms exhibit catch means for engaging said mounting edges of said bottle member.

2. The water bottle apparatus of claim 1 wherein said bottle member exhibits a shape with a flattened side arranged to fit proximate the animal enclosure.

3. The water bottle apparatus of claim 2 wherein said base of said clip means comprises a straight portion arranged to be interposed between said flattened side of said bottle member and the animal enclosure.

4. The water bottle apparatus of claim 1 wherein said catch means comprises hook members defined on said arms of said clip means for engaging said mounting edges of said bottle member.

5. The water bottle apparatus of claim 4 wherein said arms of said clip means exhibit a resilient flex.

6. The water bottle apparatus of claim 5 wherein said arms of said clip means include outwardly flaring extensions.

7. The water bottle apparatus of claim 6 wherein said mounting edges of said bottle member comprise a transition between a wider portion of said bottle member and a narrower portion of said bottle member.

8. The water, bottle apparatus of claim 7 wherein said bottle member exhibits a shape with a flattened side arranged to fit proximate the animal enclosure.

9. The water bottle apparatus of claim 8 wherein said base of said clip means comprises a straight portion arranged to be interposed between said flattened side of said bottle member and the animal enclosure.

10. The water bottle apparatus of claim 4 wherein said mounting edges of said bottle member comprise a transition between a wider portion of said bottle member and a narrower portion of said bottle member.

11. The water bottle apparatus of claim 10 wherein said bottle member exhibits a shape with a flattened side arranged to fit proximate the animal enclosure.

12. The water bottle apparatus of claim 11 wherein said base of said clip means comprises a straight portion arranged to be interposed between said flattened side of said bottle member and the animal enclosure.

13. The water bottle apparatus of claim 1 wherein said arms of said clip means exhibit a resilient flex.

14. The water bottle apparatus of claim 13 wherein said arms of said clip means include outwardly flaring extensions.

15. The water bottle apparatus of claim 1 wherein said mounting edges of said bottle member comprise a transition between a wider portion of said bottle member and a narrower portion of said bottle member.

* * * * *